United States Patent
Roberts et al.

(10) Patent No.: US 11,035,339 B2
(45) Date of Patent: Jun. 15, 2021

(54) SHEAR WEB ASSEMBLY INTERCONNECTED WITH ADDITIVE MANUFACTURED COMPONENTS

(71) Applicant: General Electric Company, Schenectady, NY (US)

(72) Inventors: David Roberts, Amsterdam (NL); Nicholas K. Althoff, La Crosse, WI (US); Michael Wenani Nielsen, Bjert (DK); James Robert Tobin, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 79 days.

(21) Appl. No.: 15/935,272

(22) Filed: Mar. 26, 2018

(65) Prior Publication Data

US 2019/0293048 A1    Sep. 26, 2019

(51) Int. Cl.
  *F01D 1/06* (2006.01)
  *F03D 1/06* (2006.01)
  (Continued)

(52) U.S. Cl.
  CPC ............ *F03D 1/0675* (2013.01); *B29C 64/10* (2017.08); *B29C 65/02* (2013.01); *B29C 65/08* (2013.01);
  (Continued)

(58) Field of Classification Search
  CPC .......... F01D 5/288; F01D 5/20; C25D 15/00; C25D 7/008; C25D 5/12;
  (Continued)

(56) References Cited

U.S. PATENT DOCUMENTS

| RE19,412 E | 1/1935 | Zaparka |
|---|---|---|
| 2,450,440 A | 10/1948 | Mills |

(Continued)

FOREIGN PATENT DOCUMENTS

| CN | 101906251 A | 12/2010 |
|---|---|---|
| CN | 103358564 A | 10/2013 |

(Continued)

OTHER PUBLICATIONS

Thamizhisai Periyaswamy, Karthikeyan Balasubramanian, Christopher Pastore, "Novel characterization method for fibrous materials using non-contact acoustics: Material properties revealed by ultrasonic perturbations", Sep. 16, 2014, Elsevier, Ultrasonics 56, 261-369 (Year: 2014).*

(Continued)

*Primary Examiner* — J. Todd Newton
*Assistant Examiner* — Andrew J Marien
(74) *Attorney, Agent, or Firm* — Dority & Manning, P.A.

(57) ABSTRACT

A method for assembling a shear web assembly of a wind turbine includes providing at least one spar cap. The method also includes forming a spar connecting member of a thermoplastic material via additive manufacturing. Further, the method includes securing the spar connecting member to the spar cap. Moreover, the method includes providing a shear web, forming a web connecting member of a thermoplastic material via additive manufacturing, and securing the web connecting member at a first end of the shear web. In addition, the method includes interconnecting the web connecting member and the spar connecting member at a joint. Thus, the method further includes heating the joint to secure the web connecting member and the spar connecting member together.

16 Claims, 6 Drawing Sheets

(51) Int. Cl.

| | |
|---|---|
| *B29C 65/08* | (2006.01) |
| *B29C 65/82* | (2006.01) |
| *B29C 65/48* | (2006.01) |
| *B29C 65/56* | (2006.01) |
| *B29C 65/14* | (2006.01) |
| *B29C 65/22* | (2006.01) |
| *B29C 64/10* | (2017.01) |
| *B33Y 10/00* | (2015.01) |
| *B33Y 80/00* | (2015.01) |
| *B29C 65/78* | (2006.01) |
| *B29C 65/00* | (2006.01) |
| *B29D 99/00* | (2010.01) |
| *B29C 65/02* | (2006.01) |
| *F01D 5/28* | (2006.01) |
| *F01D 5/20* | (2006.01) |
| *C25D 15/00* | (2006.01) |
| *C25D 7/00* | (2006.01) |
| *C25D 5/12* | (2006.01) |
| *B29K 101/12* | (2006.01) |
| *B29L 31/08* | (2006.01) |

(52) U.S. Cl.
CPC .......... *B29C 65/1425* (2013.01); *B29C 65/22* (2013.01); *B29C 65/48* (2013.01); *B29C 65/565* (2013.01); *B29C 65/7826* (2013.01); *B29C 65/82* (2013.01); *B29C 66/112* (2013.01); *B29C 66/114* (2013.01); *B29C 66/1122* (2013.01); *B29C 66/12461* (2013.01); *B29C 66/43441* (2013.01); *B29C 66/54* (2013.01); *B29C 66/721* (2013.01); *B29C 66/7392* (2013.01); *B29C 66/73921* (2013.01); *B29D 99/0028* (2013.01); *B33Y 10/00* (2014.12); *B33Y 80/00* (2014.12); *C25D 5/12* (2013.01); *C25D 7/008* (2013.01); *C25D 15/00* (2013.01); *F01D 5/20* (2013.01); *F01D 5/288* (2013.01); *B29K 2101/12* (2013.01); *B29L 2031/085* (2013.01); *F05B 2220/30* (2013.01); *F05B 2230/00* (2013.01); *F05B 2230/232* (2013.01); *F05B 2230/60* (2013.01); *F05B 2240/221* (2013.01); *F05B 2250/11* (2013.01); *F05B 2280/4007* (2013.01); *F05D 2230/30* (2013.01); *F05D 2230/90* (2013.01); *F05D 2300/177* (2013.01); *F05D 2300/6032* (2013.01)

(58) Field of Classification Search
CPC ......... F05D 2300/6032; F05D 2230/90; F05D 2230/30; F05D 2300/177; F05D 2300/175; F03D 1/0675; F05B 2250/11; B33Y 80/00
See application file for complete search history.

(56) References Cited

U.S. PATENT DOCUMENTS

| | | | |
|---|---|---|---|
| 2,451,131 A | 10/1948 | Vidal | |
| 2,503,450 A | 4/1950 | Nebesar | |
| 3,000,446 A | 9/1961 | Warnken | |
| 3,093,219 A | 6/1963 | Ramme | |
| 3,137,887 A | 6/1964 | Mannino et al. | |
| 3,321,019 A | 5/1967 | Dmitroff et al. | |
| 3,528,753 A | 9/1970 | Dutton et al. | |
| 3,586,460 A | 6/1971 | Toner | |
| 3,956,564 A | 5/1976 | Hillig | |
| 4,319,872 A | 3/1982 | Lupke | |
| 4,329,119 A | 5/1982 | Baskin | |
| 4,331,723 A * | 5/1982 | Hamm | B29C 70/865 |
| | | | 428/61 |
| 4,474,536 A | 10/1984 | Gougeon et al. | |
| 4,626,172 A | 12/1986 | Mouille et al. | |
| 4,718,844 A | 1/1988 | Dickhut | |
| 5,059,109 A | 10/1991 | Dickhut | |
| 5,088,665 A | 2/1992 | Vijgen et al. | |
| 5,346,367 A | 9/1994 | Doolin et al. | |
| 6,264,877 B1 | 7/2001 | Pallu De La Barriere | |
| 6,890,152 B1 | 5/2005 | Thisted | |
| 6,945,727 B2 * | 9/2005 | Christman | B29C 65/00 |
| | | | 403/109.8 |
| 7,059,833 B2 | 6/2006 | Stiesdal et al. | |
| 7,244,487 B2 * | 7/2007 | Brantley | B29C 65/561 |
| | | | 244/123.7 |
| 7,364,407 B2 | 4/2008 | Grabau | |
| 7,458,777 B2 | 12/2008 | Herr | |
| 7,637,721 B2 | 12/2009 | Driver et al. | |
| 7,712,993 B2 * | 5/2010 | Frisch | E04C 2/243 |
| | | | 244/132 |
| 7,976,275 B2 | 7/2011 | Miebach et al. | |
| 7,988,421 B2 | 8/2011 | Bakhuis et al. | |
| 8,007,624 B2 * | 8/2011 | Stiesdal | B29C 33/505 |
| | | | 156/285 |
| 8,062,728 B2 | 11/2011 | De Beats | |
| 8,083,488 B2 | 12/2011 | Fritz | |
| 8,092,187 B2 | 1/2012 | Bell et al. | |
| 8,162,590 B2 | 4/2012 | Haag | |
| 8,273,806 B2 | 9/2012 | Guadagno et al. | |
| 8,317,479 B2 | 11/2012 | Vronsky et al. | |
| 8,376,450 B1 | 2/2013 | Long et al. | |
| 8,393,871 B2 * | 3/2013 | Yarbrough | F03D 1/065 |
| | | | 416/226 |
| 8,540,491 B2 | 9/2013 | Gruhn | |
| 8,602,761 B2 | 12/2013 | Arrizabalaga | |
| 8,657,581 B2 | 2/2014 | Pilpel et al. | |
| 8,673,106 B1 | 3/2014 | Jolley et al. | |
| 8,678,746 B2 | 3/2014 | Haag | |
| 8,708,691 B2 | 4/2014 | Matsen et al. | |
| 8,747,098 B1 | 6/2014 | Johnson et al. | |
| 8,865,798 B2 | 10/2014 | Merle et al. | |
| 8,877,116 B2 | 11/2014 | Grabau | |
| 8,932,024 B2 | 1/2015 | Hayashi et al. | |
| 8,961,142 B2 | 2/2015 | Wansink | |
| 8,992,813 B2 | 3/2015 | Robbins et al. | |
| 9,090,027 B2 | 7/2015 | Sutton | |
| 9,150,721 B2 | 10/2015 | Bateman et al. | |
| 9,377,005 B2 | 6/2016 | Yarbrough et al. | |
| 9,434,142 B2 | 9/2016 | Levit | |
| 9,458,821 B2 | 10/2016 | Jacobsen et al. | |
| 9,512,818 B2 | 12/2016 | Richtman | |
| 9,719,489 B2 | 8/2017 | Stewart | |
| 10,131,092 B1 * | 11/2018 | Cook | B29C 66/439 |
| 10,273,935 B2 | 4/2019 | Albert | |
| 2007/0065290 A1 | 3/2007 | Herr | |
| 2007/0077150 A1 | 4/2007 | Llorente Gonzalez | |
| 2007/0107189 A1 | 5/2007 | Prichard | |
| 2009/0068017 A1 | 3/2009 | Rudling | |
| 2009/0074585 A1 | 3/2009 | Koegler et al. | |
| 2009/0087318 A1 * | 4/2009 | Althoff | F03D 1/0675 |
| | | | 416/226 |
| 2009/0140527 A1 | 6/2009 | Pawar | |
| 2009/0148300 A1 | 6/2009 | Driver et al. | |
| 2009/0155084 A1 | 6/2009 | Livingston et al. | |
| 2009/0301648 A1 | 12/2009 | Hogg | |
| 2010/0047070 A1 | 2/2010 | Slot | |
| 2010/0121475 A1 | 5/2010 | Lyons | |
| 2010/0135806 A1 | 6/2010 | Benito | |
| 2010/0135815 A1 * | 6/2010 | Bagepalli | F03D 1/0675 |
| | | | 416/226 |
| 2010/0296940 A1 | 11/2010 | Zuteck | |
| 2010/0296941 A1 | 11/2010 | Zuteck | |
| 2011/0018282 A1 | 1/2011 | Hayashi et al. | |
| 2011/0076149 A1 | 3/2011 | Santiago et al. | |
| 2011/0097211 A1 | 4/2011 | Rudling | |
| 2011/0097326 A1 | 4/2011 | Luehrsen | |
| 2011/0100540 A1 | 5/2011 | Mathew | |
| 2011/0135467 A1 | 6/2011 | Saddoughi et al. | |
| 2011/0142635 A1 | 6/2011 | Frizt | |
| 2011/0142667 A1 | 6/2011 | Miebach et al. | |
| 2011/0142668 A1 | 6/2011 | Rao | |

(56) References Cited

U.S. PATENT DOCUMENTS

| | | |
|---|---|---|
| 2011/0142670 A1 | 6/2011 | Pilpel |
| 2011/0176928 A1* | 7/2011 | Jensen .................. F03D 1/0675 416/233 |
| 2011/0200444 A1 | 8/2011 | Garcia |
| 2011/0223028 A1 | 9/2011 | Stege et al. |
| 2011/0243736 A1 | 10/2011 | Bell |
| 2011/0243750 A1 | 10/2011 | Gruhn |
| 2011/0266721 A1 | 11/2011 | Song et al. |
| 2011/0268558 A1 | 11/2011 | Driver |
| 2011/0286853 A1 | 11/2011 | Kristensen |
| 2012/0009069 A1 | 1/2012 | Grove-Nielsen |
| 2012/0027590 A1 | 2/2012 | Bonnet |
| 2012/0027610 A1* | 2/2012 | Yarbrough ............ F03D 1/0683 416/226 |
| 2012/0027612 A1 | 2/2012 | Yarbrough |
| 2012/0027613 A1* | 2/2012 | Yarbrough .............. F03D 1/065 416/226 |
| 2012/0121430 A1 | 5/2012 | Olsen et al. |
| 2012/0128810 A1 | 5/2012 | Arriola Arizabalaga et al. |
| 2012/0134848 A1 | 5/2012 | Ramirez Jimenez et al. |
| 2012/0138218 A1 | 6/2012 | Dean et al. |
| 2012/0183408 A1 | 7/2012 | Noerlem |
| 2012/0186730 A1 | 7/2012 | Sindo |
| 2012/0263913 A1 | 10/2012 | Karem |
| 2013/0108455 A1* | 5/2013 | Quiring ................. F03D 1/0675 416/233 |
| 2013/0164133 A1 | 6/2013 | Grove-Nielsen |
| 2013/0186558 A1 | 7/2013 | Comb |
| 2013/0241117 A1 | 9/2013 | Lind |
| 2014/0072715 A1 | 3/2014 | Jones et al. |
| 2014/0178204 A1 | 6/2014 | Livingston et al. |
| 2014/0186175 A1 | 7/2014 | Baehmann et al. |
| 2014/0205454 A1 | 7/2014 | Giovannetti et al. |
| 2014/0295187 A1 | 10/2014 | Jacobsen |
| 2014/0322023 A1 | 10/2014 | Tapia |
| 2014/0328692 A1 | 11/2014 | Riddell et al. |
| 2014/0334930 A1* | 11/2014 | Rob ...................... F03D 1/0633 416/147 |
| 2015/0224759 A1 | 8/2015 | Boon |
| 2015/0247487 A1 | 9/2015 | Oerlemans et al. |
| 2015/0308404 A1* | 10/2015 | Dahl ..................... B29C 70/541 416/230 |
| 2015/0316028 A1* | 11/2015 | Brekenfeld ........... F03D 1/0675 416/229 R |
| 2015/0322920 A1 | 11/2015 | Jones |
| 2016/0023433 A1 | 1/2016 | Langone |
| 2016/0107397 A1 | 4/2016 | Schibsbye |
| 2016/0146019 A1 | 5/2016 | Pizano et al. |
| 2016/0168997 A1 | 6/2016 | Garm |
| 2016/0263844 A1 | 9/2016 | Smith |
| 2016/0297145 A1 | 10/2016 | Wu |
| 2016/0319801 A1* | 11/2016 | Smith ...................... B29C 70/44 |
| 2016/0327019 A1 | 11/2016 | Tobin et al. |
| 2016/0327020 A1 | 11/2016 | Tobin et al. |
| 2016/0327021 A1 | 11/2016 | Tobin et al. |
| 2016/0354984 A1 | 12/2016 | Hedges |
| 2016/0377050 A1 | 12/2016 | Caruso et al. |
| 2016/0377051 A1 | 12/2016 | Caruso et al. |
| 2016/0377052 A1 | 12/2016 | Caruso et al. |
| 2017/0015066 A1 | 1/2017 | Herrmann |
| 2017/0021575 A1* | 1/2017 | Hansen ................. F03D 1/0675 |
| 2017/0022821 A1 | 1/2017 | Ferber |
| 2017/0030330 A1* | 2/2017 | Caruso ..................... F03D 1/065 |
| 2017/0050372 A1* | 2/2017 | Nielsen .................. B29C 65/48 |
| 2017/0051718 A1 | 2/2017 | Klitgaard |
| 2017/0057158 A1 | 3/2017 | Caruso et al. |
| 2017/0058862 A1 | 3/2017 | Caruso et al. |
| 2017/0058865 A1 | 3/2017 | Caruso et al. |
| 2017/0074236 A1 | 3/2017 | Hynum et al. |
| 2017/0074237 A1 | 3/2017 | Caruso et al. |
| 2017/0074238 A1 | 3/2017 | Tobin et al. |
| 2017/0074240 A1* | 3/2017 | Caruso ................. F03D 1/0675 |
| 2017/0082087 A1 | 3/2017 | Yarbrough |
| 2017/0082088 A1 | 3/2017 | Yarbrough et al. |
| 2017/0100902 A1 | 4/2017 | Asmatulu et al. |
| 2017/0113265 A1 | 4/2017 | Slavens et al. |
| 2017/0120336 A1* | 5/2017 | DeMuth ................. G02B 15/04 |
| 2017/0122287 A1 | 5/2017 | Dobbe et al. |
| 2017/0145990 A1 | 5/2017 | Drack et al. |
| 2017/0175534 A1 | 6/2017 | Ferber |
| 2017/0204833 A1 | 7/2017 | Albert et al. |
| 2017/0252966 A1 | 9/2017 | Susnjara |
| 2017/0306766 A1 | 10/2017 | Munzer |
| 2018/0135602 A1 | 5/2018 | Tobin et al. |
| 2018/0156190 A1 | 6/2018 | Johnson |
| 2018/0216601 A1 | 8/2018 | Yarbrough |
| 2018/0223794 A1* | 8/2018 | Tobin .................... F03D 1/0675 |
| 2018/0229452 A1 | 8/2018 | Ogale |
| 2018/0264749 A1* | 9/2018 | Albert .................... B33Y 10/00 |
| 2018/0283349 A1* | 10/2018 | Wardropper .......... F03D 1/0675 |
| 2018/0311927 A1 | 11/2018 | Tyan |
| 2019/0001589 A1 | 1/2019 | Salimi |
| 2019/0032491 A1 | 1/2019 | Nissen et al. |
| 2019/0153994 A1 | 5/2019 | Tobin |
| 2019/0178227 A1* | 6/2019 | Hawkins ................. B29C 70/52 |
| 2019/0195191 A1 | 6/2019 | Girolamo |
| 2019/0291861 A1 | 9/2019 | McIntyre et al. |
| 2019/0293049 A1 | 9/2019 | Roberts |

FOREIGN PATENT DOCUMENTS

| | | |
|---|---|---|
| CN | 204488065 U | 7/2015 |
| CN | 104955278 A | 9/2015 |
| CN | 107187020 A | 9/2018 |
| EP | 0435466 A2 | 7/1991 |
| EP | 2 204 577 A2 | 7/2010 |
| EP | 2653717 A1 | 10/2013 |
| EP | 3037655 A1 | 6/2016 |
| EP | 3 138 697 A1 | 8/2017 |
| ES | 237 1893 | 11/2012 |
| JP | H07102609 B2 | 11/1995 |
| JP | 2000 317972 A | 11/2000 |
| JP | 2007/009926 A | 1/2007 |
| JP | 2007/092716 A | 4/2007 |
| JP | 2012 158151 A | 8/2012 |
| KR | 101 520 898 B1 | 5/2015 |
| WO | WO2006/039953 | 4/2006 |
| WO | WO2010/025830 A2 | 3/2010 |
| WO | WO2011/088835 A2 | 7/2011 |
| WO | WO2011/098785 A2 | 8/2011 |
| WO | WO2012/076168 A2 | 6/2012 |
| WO | WO2013/023745 A1 | 2/2013 |
| WO | WO2013/178624 A2 | 12/2013 |
| WO | WO2015/015202 A1 | 2/2015 |
| WO | WO 2017/092766 A1 | 6/2017 |
| WO | WO2018/015250 A1 | 1/2018 |

OTHER PUBLICATIONS

U.S. Appl. No. 15/424,055, filed Feb. 3, 2017.
U.S. Appl. No. 15/424,084, filed Feb. 3, 2017.
International Search Report, dated Jun. 24, 2019.
Zhai, Yuwei et. al., Additive Manufacturing: Making Imagination the Major Limitation, Journal of Metals, vol. 66, No. 5, Springer, NY, Mar. 11, 2014. pp. 808-816.
CGTech VERICUT, Automated Fibre Placement—wind blade: VERICUT Composite CNC simulation, Sep. 16, 2015, YouTube, retrieved from the Internet on Sep. 28, 2019, URL: https://youtu.be/xFNtTE82DiU (Year: 2015).
Patlolla, New progress in self-healing technology of composite wind turbine blades, Department of Mechanical Engineering, Wichita State Univeristy, https://soar.wichita.edu/handle/10057/5493, Feb. 16, 2012, (Abstract Only).
Matt, Development of Novel Self-Healing Polymer Composites for Use in Wind Turbine Blades http://energyresources.asmedigitalcollection.asme.org/article.aspx?articleid=2174064, The American Society of Mechanical Engineers, Journal of Energy Resources Technology, vol. 137, Issue 5, Sep. 1, 2015 (Abstract Only).

(56) References Cited

OTHER PUBLICATIONS

Teuwen et al., Vacuum Infused Thermoplastic Composites for Wind Turbine Blades, 2008 Wind Turbine Blade Workshop—Sandia National Laboratories, Jun. 3, 2008, 22 pages.

* cited by examiner

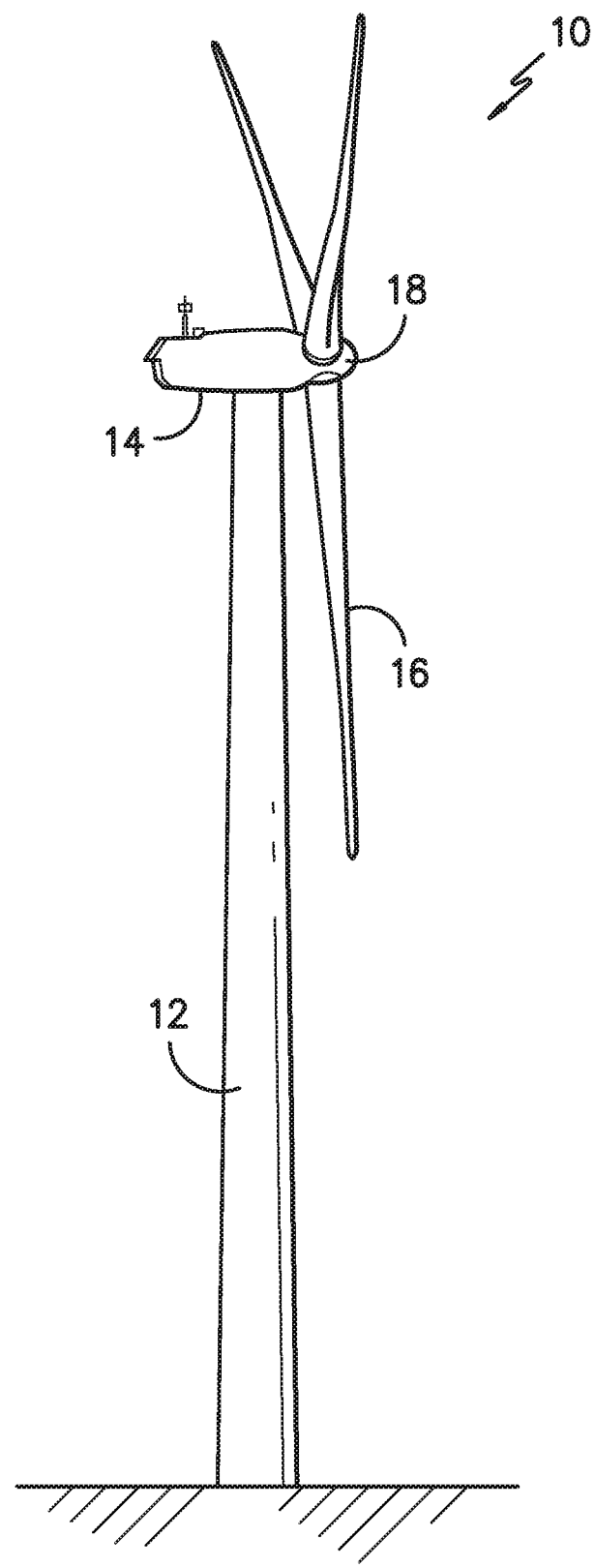
FIG. -1-

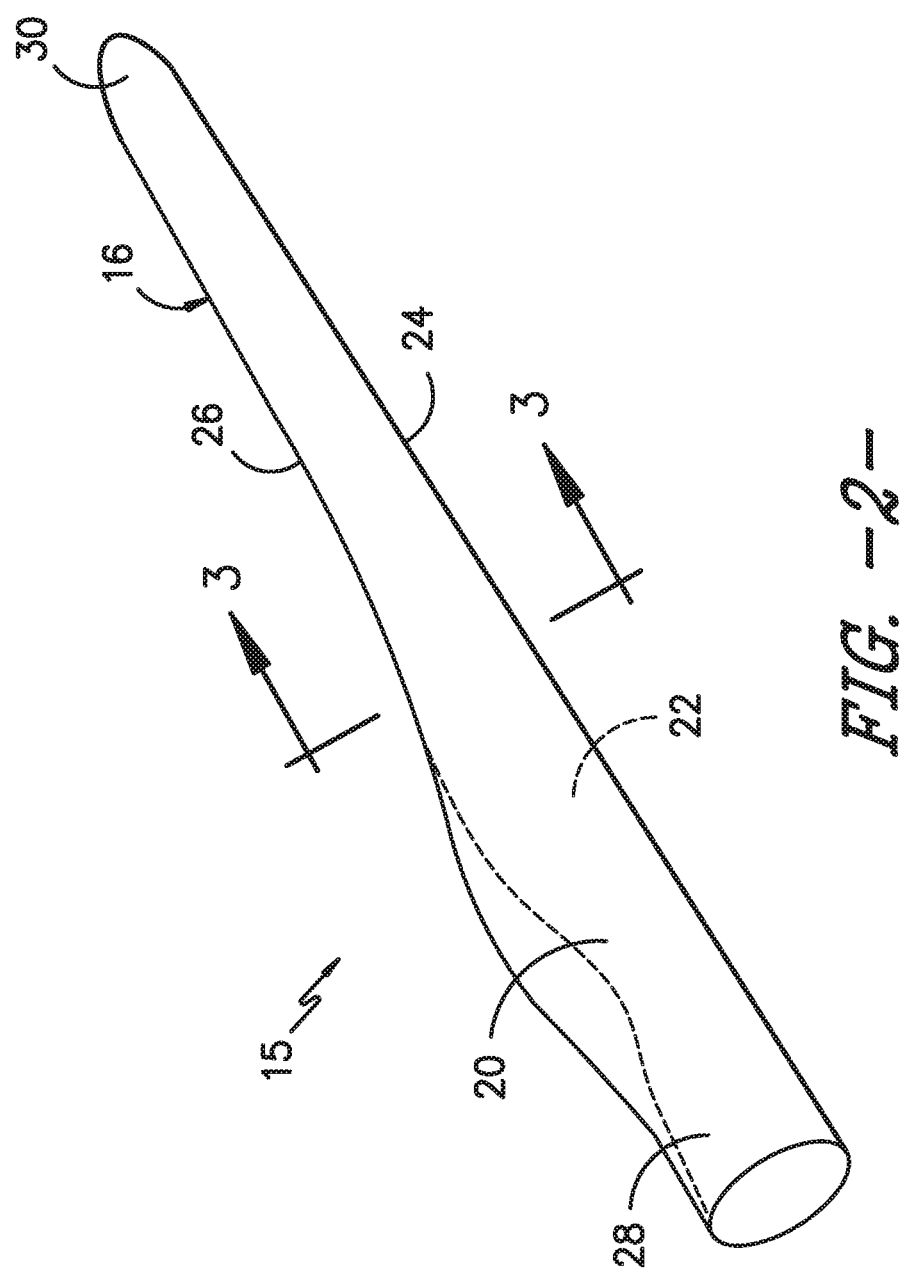
FIG. -2-

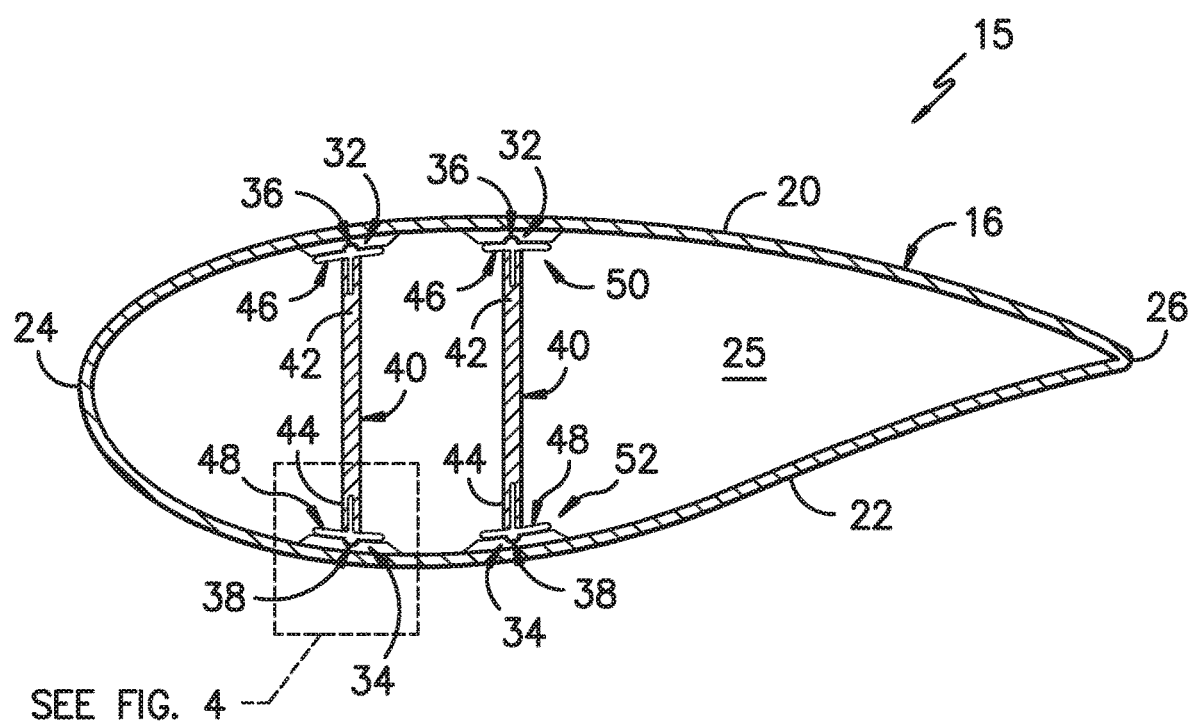
FIG. -3-
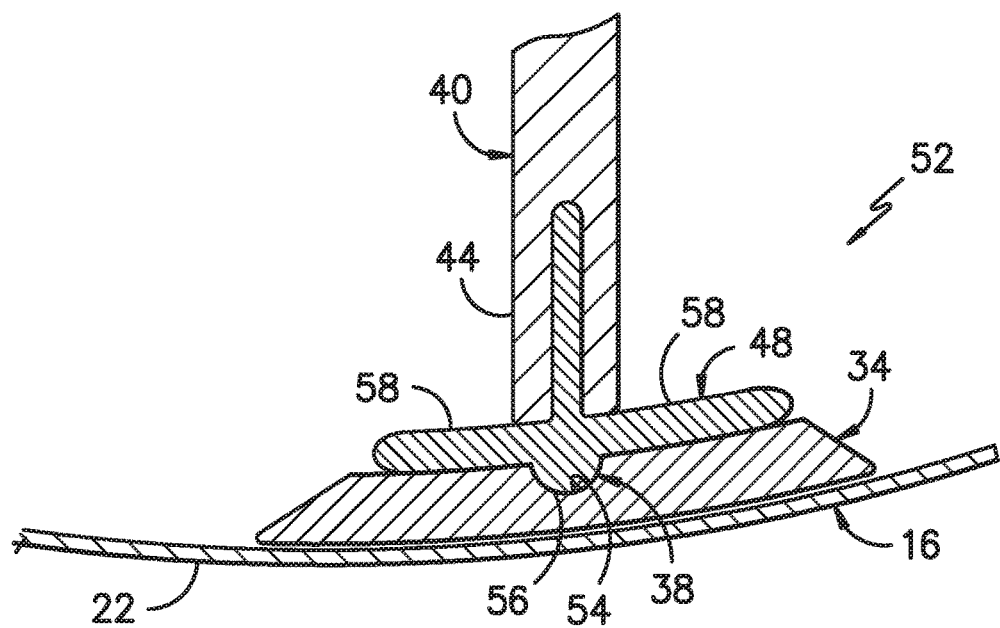
FIG. -4-

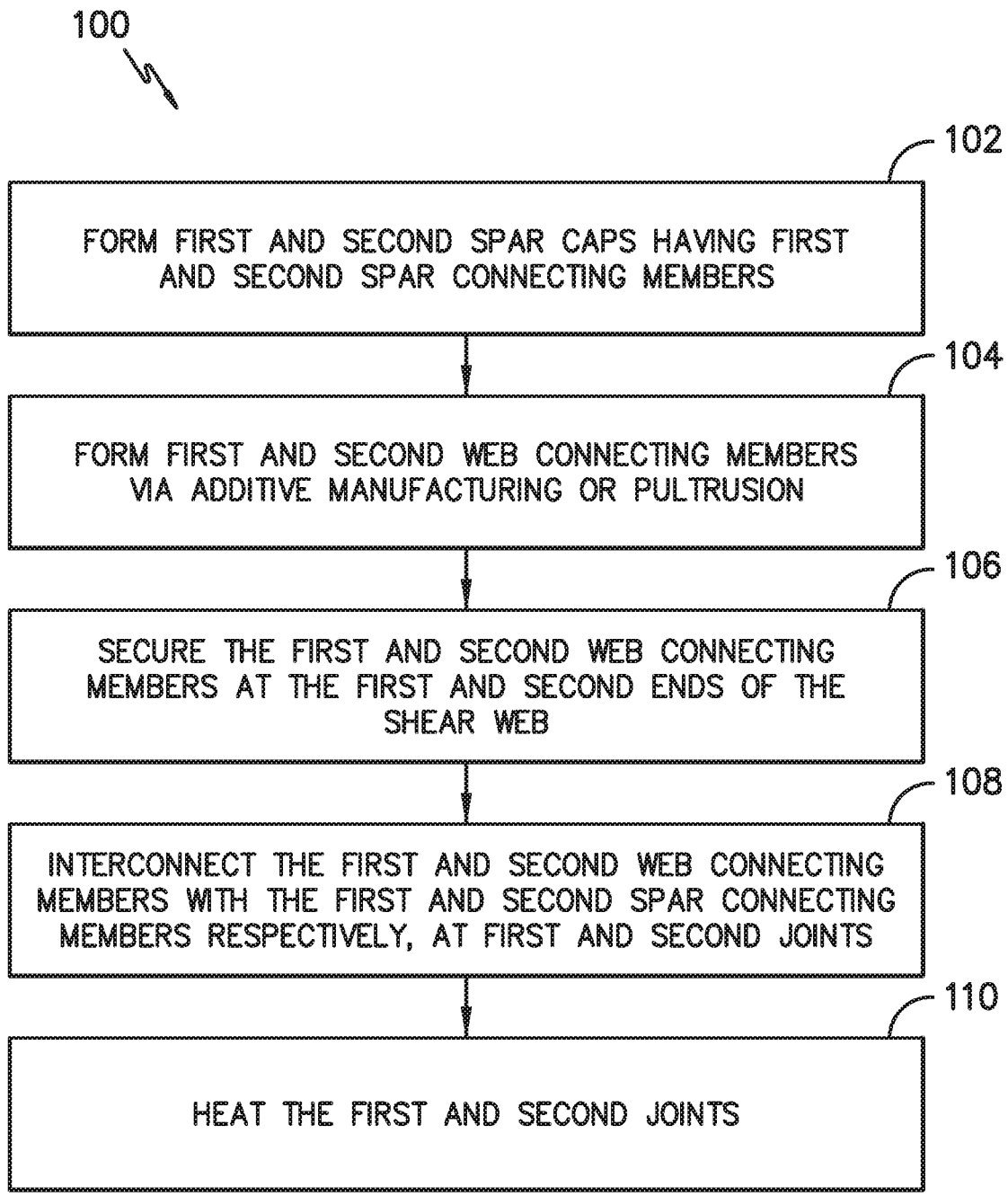
FIG. -5-

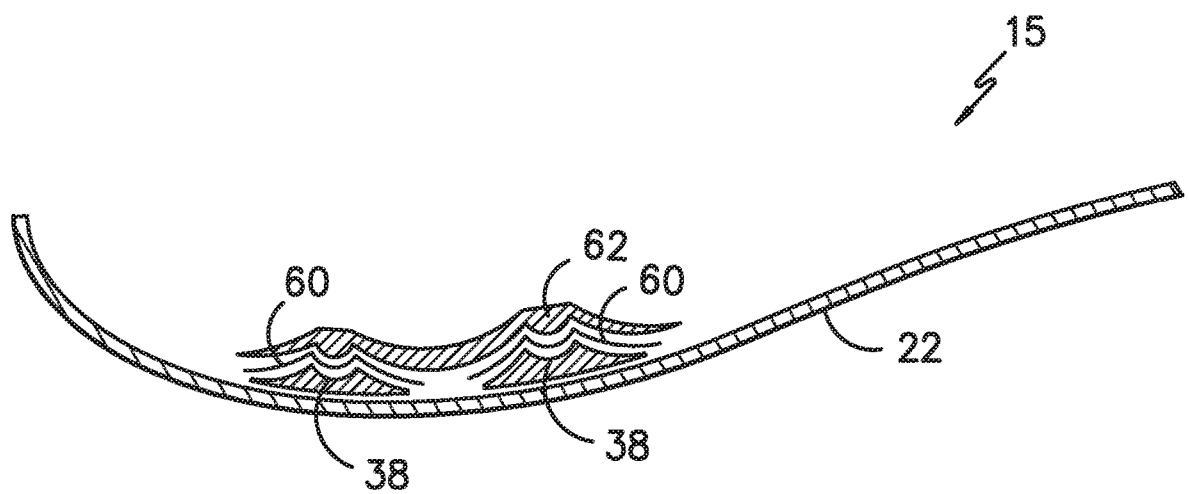
FIG. -6-
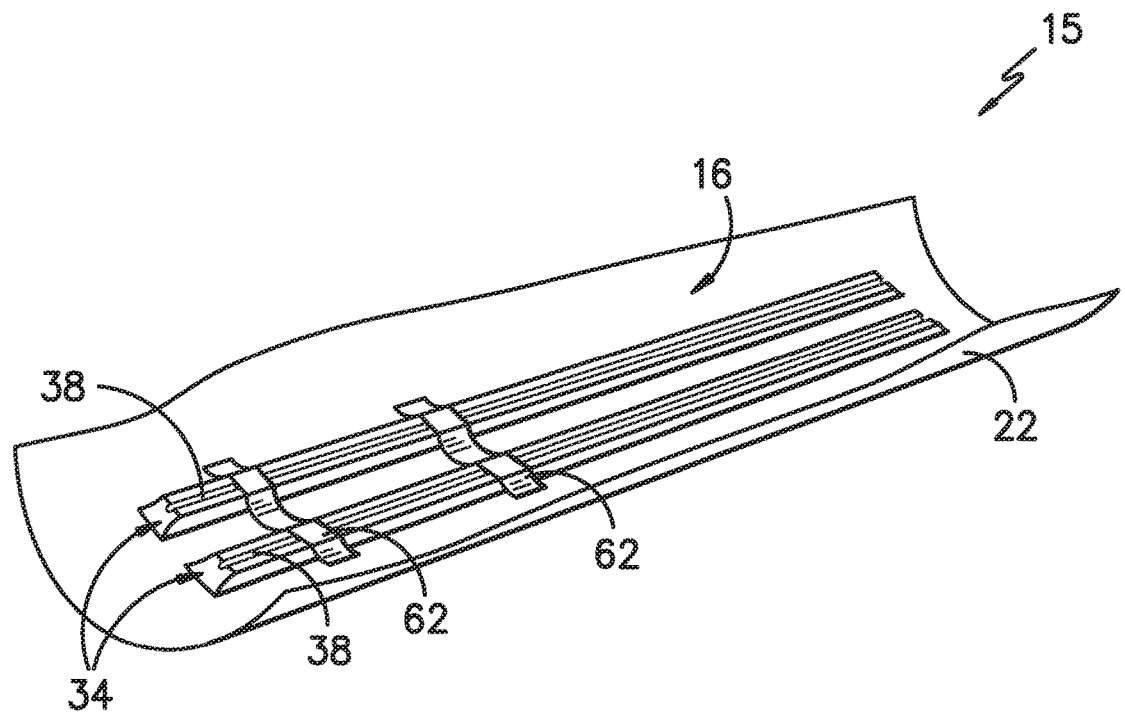
FIG. -7-

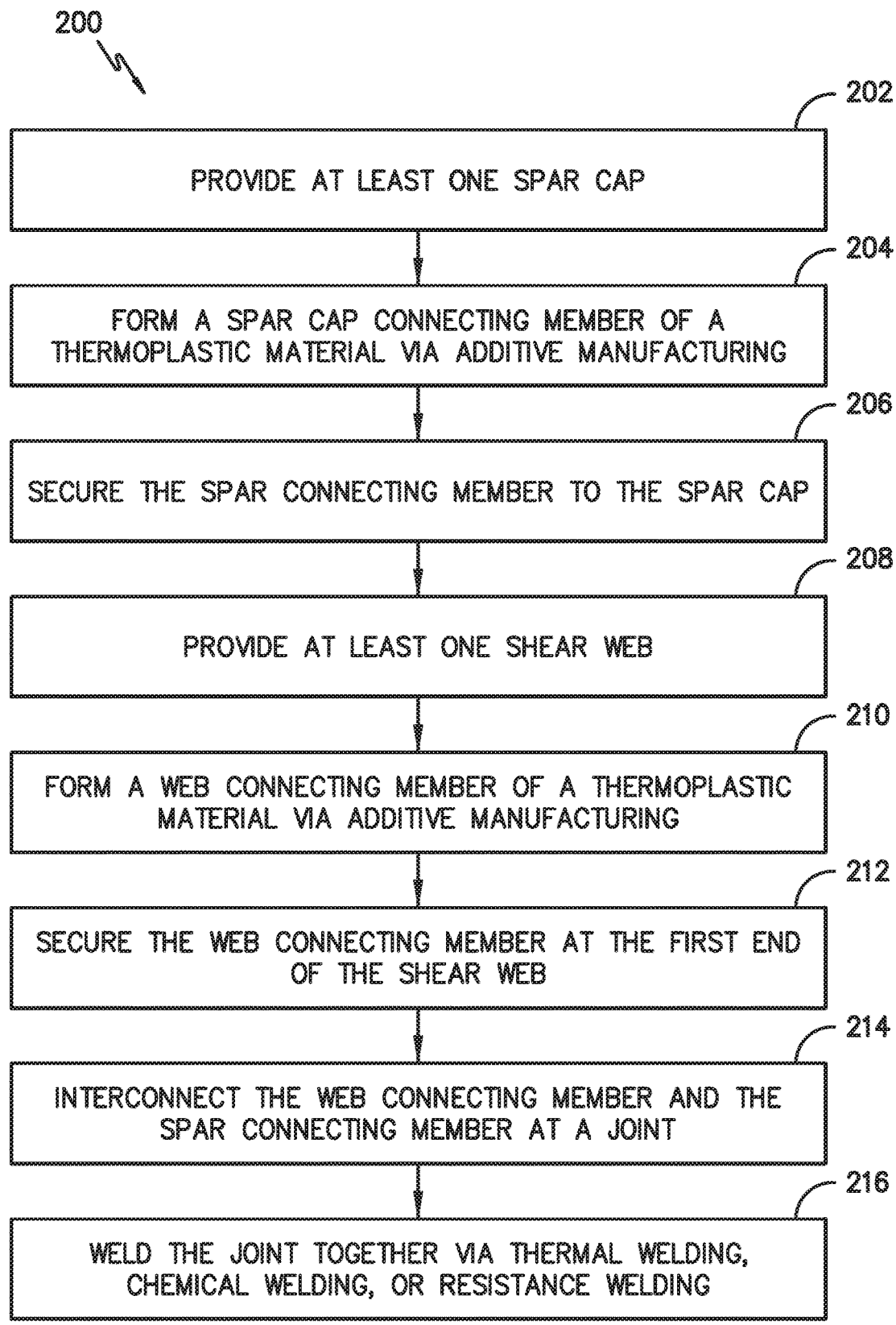
FIG. -8-

SHEAR WEB ASSEMBLY INTERCONNECTED WITH ADDITIVE MANUFACTURED COMPONENTS

FIELD

The present invention relates generally to wind turbines, and more particularly to shear webs for wind turbines interconnected with additive manufactured components.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The rotor blades are the primary elements for converting wind energy into electrical energy. The blades have the cross-sectional profile of an airfoil such that, during operation, air flows over the blade producing a pressure difference between the sides. Consequently, a lift force, which is directed from a pressure side towards a suction side, acts on the blade. The lift force generates torque on the main rotor shaft, which is geared to the generator for producing electricity.

The rotor blades typically consist of a suction side shell and a pressure side shell that are bonded together at bond lines along the leading and trailing edges of the blade. An internal shear web extends between the pressure and suction side shell members and is bonded to spar caps affixed to the inner faces of the shell members. Relatively exact length dimensions are required for the shear web to span between the spar caps and achieve a bond between the spar caps and shear web having sufficient width and thickness dimensions. Achieving these dimensions, as well as an adequate bond, can be difficult and the juncture between the spar caps and shear web is a time-consuming and tedious process that often requires significant re-work.

With typical blade configurations, the shear web is a continuous member that spans between the spar caps, and a rigid flange is used to achieve a desired bond width for bond paste applied between the spar caps and transverse ends of the shear web. This configuration, however, places significant stresses at the juncture between the shear web and spar cap and often results in the use of excess bond paste to achieve a desired bond width at this critical juncture. The excess paste, however, can contribute unnecessary weight to the blade. In addition, the excess squeeze out of the paste can break off into pieces of cured past that can rattle around inside of the rotor blade during operation of the wind turbine (a not uncommon complaint from wind turbine owners/operators). Also, air voids and unpredictable squeeze-out of the bond paste in the typical configurations can result in areas of decreased bond strength, which is particularly problematic in sections of the blade where repair is not possible from within the rotor blade.

Accordingly, the industry would benefit from an improved joint between the shear web and spar caps that addresses the aforementioned issues.

BRIEF DESCRIPTION

Aspects and advantages of the invention will be set forth in part in the following description, or may be obvious from the description, or may be learned through practice of the invention.

In one aspect, the present disclosure is directed to a method for assembling a rotor blade of a wind turbine. The method includes forming a first spar connecting member. The method also includes providing a shear web. Further, the method includes providing a first web connecting member at a first end of the shear web. The first spar connecting member and the first web connecting member are formed of a thermoplastic material. As such, the method includes interconnecting the first web connecting member and the first spar connecting member at a first joint. In addition, the method includes heating the first joint to secure the first web connecting member and the first spar connecting member together.

In one embodiment, the method may also include forming a second spar connecting member made of a thermoplastic material, providing a second web connecting member at an opposing, second end of the shear web and also made of a thermoplastic material, interconnecting the second web connecting member and the second spar connecting member at a second joint, and heating the second joint to secure the second web connecting member and the second spar connecting member together.

In another embodiment, the method may include forming a lower shell member of the rotor blade, forming a second spar cap on the lower shell member, the second spar cap containing the second spar connecting member, interconnecting the second web connecting member and the second spar connecting member at the second joint, forming an upper shell member of the rotor blade, forming a first spar cap on the upper shell member, the second spar cap containing the second spar connecting member, interconnecting the first web connecting member and the first spar connecting member at the first joint, and heating the first and second joints.

In further embodiments, the method may include forming the first and second web connecting members via at least one of additive manufacturing, thermoforming, vacuum forming, pultrusion, continuous molding, extrusion molding (e.g. in parts), or combinations thereof. Similarly, the method may include forming the first and second spar connecting members via at least one of additive manufacturing, thermoforming, vacuum forming, pultrusion, continuous molding, extrusion molding, or combinations thereof.

In additional embodiments, the method may include forming the first joint and/or the second joint via an ultrasound signal transmitting material and inspecting at least one of the first joint or the second joint via non-destructive testing (NDT) inspection.

In several embodiments, the method may further include securing the first and second web connecting members to the first and second ends of the shear web, respectively, via at least one of via infusion, insertion/interference fit, adhesives, fasteners, or combinations thereof.

In particular embodiments, the step forming the first and second spar caps having the first and second spar connecting members, respectively, may include co-infusing the first spar connecting member with the first spar cap and co-infusing the second spar connecting member with the second spar cap.

In certain embodiments, the first and second spar connecting members may each include a female connector, whereas the first and second web connecting members may each include a corresponding a male connector.

In still further embodiments, the method may also include providing a cover material atop at least one of the first and second spar connecting members or the first and second web connecting members to protect the connecting members from debris before interconnecting. In such embodiments, the method may include removing the cover material from at least one of the first and second spar connecting members or the first and second web connecting members before interconnecting the first web connecting member and the first spar connecting member and the second web connecting member and the second spar connecting member.

In additional embodiments, the method may include placing a positioning spacer atop at least one of the first and second spar connecting members for alignment of at least one of the first and second web connecting members. In yet another embodiment, the method may include reinforcing the thermoplastic material with at least one fiber material.

In another aspect, the present disclosure is directed to a method for assembling a shear web assembly of a rotor blade of a wind turbine. The method includes forming a spar connecting member of a thermoplastic material via additive manufacturing. Further, the method includes securing the spar connecting member to the rotor blade (e.g. to the blade shell and/or a structural component such as a spar cap). Moreover, the method includes providing a shear web, forming a web connecting member of a thermoplastic material via additive manufacturing, and securing the web connecting member at a first end of the shear web. In addition, the method includes interconnecting the web connecting member and the spar connecting member at a joint. Thus, the method further includes securing the joint together via at least one of thermal welding, chemical welding, resistance welding, solvent welding, one or more adhesives, or microwave heating.

In yet another aspect, the present disclosure is directed to a rotor blade assembly for a wind turbine. The rotor blade assembly includes a rotor blade having an upper shell member having a first spar cap configured on an internal face thereof, a lower shell member having a second spar cap configured on an internal face thereof, the first and second spar caps comprising first and second spar connecting members, respectively, and a shear web extending between the first and second spar caps along a longitudinal length of the rotor blade. The shear web includes first and second web connecting members extending from opposing ends thereof. The first and second web connecting members are received within the first and second spar connecting members to form first and second joints, respectively. Further, the first and second spar connecting members and the first and second web connecting members are each formed of a thermoplastic material. Thus, the first and second web connecting members are retained within the first and second spar connecting members via thermoplastic welding.

In one embodiment, the first and second joints are absent of adhesive. It should also be understood that the rotor blade assembly may include any of the additional steps and/or features as described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art is set forth in the specification, which makes reference to the appended figures, in which:

FIG. 1 illustrates a perspective view of a wind turbine according to the present disclosure;

FIG. 2 illustrates a perspective view of a rotor blade of a wind turbine according to the present disclosure;

FIG. 3 illustrates a cross-sectional view of one embodiment of a rotor blade assembly of a wind turbine according to the present disclosure, particularly illustrating a shear web configured according to aspects of the present disclosure;

FIG. 4 illustrates an enlarged, partial cross-sectional view of the rotor blade of FIG. 3;

FIG. 5 illustrates a flow diagram of one embodiment of a method for assembling a rotor blade assembly of a wind turbine according to the present disclosure;

FIG. 6 illustrates a partial, cross-sectional view of one embodiment of a rotor blade assembly according to the present disclosure, particularly illustrating a cover material and a spacer positioned atop a spar cap connecting member according to aspects of the present disclosure;

FIG. 7 illustrates a partial, perspective view of one embodiment of a rotor blade assembly according to the present disclosure, particularly illustrating a spacer positioned atop a spar cap connecting member according to aspects of the present disclosure; and, FIG. 8 illustrates a flow diagram of one embodiment of a method for assembling a shear web assembly of a wind turbine according to the present disclosure.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention include such modifications and variations as come within the scope of the appended claims and their equivalents.

Generally, the present subject matter is directed to a shear web assembly constructed using a thermoplastic fiberglass additive manufacturing process. Thus, the additive components can be co-infused to the spar cap(s) and/or the shear web(s) during component manufacturing. Heating elements in the spar cap mold can then be heated to a sufficient temperature, allowing the shear web additive components to melt/merge together. Accordingly, the use of the heated elements for joining (i.e. melting/merging) the connecting members together can aid in reducing the current production cycle times. Alternatively, if there are challenges in achieving sufficient heat at the interface to thermally weld the thermoplastic interface, other embodiments include chemically welding the interface (e.g. solvent welding), resistance welding using a metal mesh strip at the interface, adhesives, and/or microwave heating. In certain instances, the thermoplastic glass transition temperature may be below the thermoplastic glass transition temperature of the blade shell resin to avoid charring/burning.

Such components assist in accurately locating the shear web(s) to the spar cap(s). In addition, since the components allows the shear web(s) and spar caps(s) to be welded together, adhesive use can be reduced or eliminated, thereby reducing adhesive cure cycle time. The additive components can also be used to help distribute load between the shear web(s) and the spar cap(s).

Referring now to the drawings, FIG. 1 illustrates a wind turbine 10 according to the present disclosure. The wind turbine 10 includes a tower 12 with a nacelle 14 mounted thereon. A plurality of rotor blades 16 are mounted to a rotor hub 18, which is in turn connected to a main flange that turns a main rotor shaft (not shown). The wind turbine power generation and control components are housed within the nacelle 14. The view of FIG. 1 is provided for illustrative purposes only to place the present invention in an exemplary field of use. It should be appreciated that the invention is not limited to any particular type of wind turbine configuration.

Referring now to FIG. 2, a more detailed view of a rotor blade assembly 15 according to the present disclosure is illustrated. As shown, the rotor blade assembly 15 includes one of the rotor blades 16 having an upper shell member 20 and a lower shell member 22. Further, the upper shell member 20 is configured as the suction side surface of the blade 16, while the lower shell member 22 is configured as the pressure side surface of the blade 16. The rotor blade 16 also includes a leading edge 24 and a trailing edge 26, as well as a root portion 28 and a tip portion 30. As is well known in the art, the upper shell member 20 and the lower shell member 22 may be joined together at the leading edge 24 and trailing edge 26. The rotor blade 16 also includes an internal cavity 25 (FIG. 3) in which various structural members, such as spar caps 32 and one or more shear webs 40 according to the present disclosure, may be configured.

Referring now to FIG. 3, a cross-sectional view of the rotor blade assembly 15 of FIG. 2 is illustrated, which incorporates various aspects of the present disclosure. As shown, the rotor blade 16 includes at least one internal structural shear web 40 that spans between the upper 20 and lower shell members 22 and extends along a longitudinal length of the rotor blade 16. In particular embodiments, as shown, the shear web 40 spans between structural first and second spar caps 32, 34 that are fixed to the internal faces of the shell members 20, 22. In addition, as shown in FIGS. 3 and 4, the first and second spar caps 32, 34 also include first and second spar connecting members 36, 38, respectively. Similarly, as shown, the shear web 40 includes first and second web connecting members 46, 48 extending from opposing ends 42, 44 thereof. Thus, as shown, the first and second web connecting members 46, 48 are received within the first and second spar connecting members 36, 38 to form first and second joints 50, 52, respectively. It should be understood that though the shear web 40 and spar caps 32, 34 form a generally I-shaped web, other cross-sectional shapes are also within the spirit and scope of the invention, including for example a H-shaped web or a C-shaped web.

In addition, the first and second spar connecting members 36, 38 and the first and second web connecting members 46, 48 are each formed of a thermoplastic material. Thus, in one embodiment, the first and second web connecting members 46, 48 may be retained within the first and second spar connecting members 38, 38 via thermoplastic welding. Accordingly, the first and second joints 50, 52 may be absent of adhesives. Alternatively, some adhesives may be used for placement of the profiles.

Referring to FIGS. 3 and 4, the first and second spar connecting members 36, 38 may include a female connector 54. For example, as shown, the first and second spar connecting members 36, 38 may include a recess. In addition, as shown, the first and second web connecting members 46, 48 may each include a corresponding male connector 56. For example, as shown, the first and second web connecting members 46, 48 may include a protrusion, rib, or similar. In addition, as shown, the male connectors 56 may include opposing flanges 58 that rest upon respective first and second spar caps 32, 34. Thus, it should be understood that the male connector 56 may have any suitable cross-sectional shape. For example, as shown, the male connectors 56 have a general T-shaped cross-section. In still further embodiments, the connecting members 65 may have an I-shaped cross-section or any other shape having the capability of functioning as described herein.

Moreover, in alternative embodiments, it should be understood that the first and second spar connecting members 36, 38 may each include the male connector 56, whereas the first and second web connecting members 46, 48 may include the female connector 54.

The thermoplastic materials used to form the first and second spar connecting members 36, 38 and/or the first and second web connecting members 46, 48 described herein generally encompass a plastic material or polymer that is reversible in nature. For example, thermoplastic materials typically become pliable or moldable when heated to a certain temperature and returns to a more rigid state upon cooling. Further, thermoplastic materials may include amorphous thermoplastic materials and/or semi-crystalline thermoplastic materials. For example, some amorphous thermoplastic materials may generally include, but are not limited to, styrenes, vinyls, cellulosics, polyesters, acrylics, polysulphones, and/or imides. More specifically, exemplary amorphous thermoplastic materials may include polystyrene, acrylonitrile butadiene styrene (ABS), polymethyl methacrylate (PMMA), glycolised polyethylene terephthalate (PET-G), polycarbonate, polyvinyl acetate, amorphous polyamide, polyvinyl chlorides (PVC), polyvinylidene chloride, polyurethane, or any other suitable amorphous thermoplastic material. In addition, exemplary semi-crystalline thermoplastic materials may generally include, but are not limited to polyolefins, polyamides, flluropolymer, ethylmethyl acrylate, polyesters, polycarbonates, and/or acetals. More specifically, exemplary semi-crystalline thermoplastic materials may include polybutylene terephthalate (PBT), polyethylene terephthalate (PET), polypropylene, polyphenyl sulfide, polyethylene, polyamide (nylon), polyetherketone, or any other suitable semi-crystalline thermoplastic material.

In addition, as mentioned, the thermoplastic materials as described herein may optionally be reinforced with a fiber material, including but not limited to glass fibers, carbon fibers, polymer fibers, wood fibers, bamboo fibers, ceramic fibers, nanofibers, metal fibers, or similar or combinations thereof. In addition, the direction of the fibers may include multi-axial, unidirectional, biaxial, triaxial, or any other another suitable direction and/or combinations thereof. Further, the fiber content may vary depending on the stiffness required in the corresponding blade component, the region or location of the blade component in the rotor blade 16, and/or the desired weldability of the component. Moreover, the fiber material(s) may include continuous fibers, e.g. in pultrusions, and/or chopped fibers.

Referring now to FIG. 5, a flow diagram of a method 100 for assembling the rotor blade 16 of the wind turbine 10 is illustrated. As shown at 102, the method 100 includes forming the first and second spar caps 32, 34 having the first and second spar connecting members 36, 38. For example, in certain embodiments, the first and second spar caps 32, 34 may be co-infused with the first and second spar connecting members 36, 38, respectively, during the manufacturing process. Alternatively, the first and second spar connecting members 36, 38 may be formed into the first and second spar caps 32, 34, respectively, during the manufacturing process. In yet another embodiment, the first and second spar connecting members 36, 38 may be formed into the blade shell, rather than the spar caps 32, 34, during the manufacturing process.

As shown at 104, the method 100 includes forming first and second web connecting members 46, 48 via technologies such as 3-D Printing, additive manufacturing, automated fiber deposition, as well as other techniques that utilize CNC control and multiple degrees of freedom to deposit material. In addition, the method 100 includes forming the first and second web connecting members 46, 48 via thermoforming, vacuum forming, pultrusion, continuous molding, extrusion molding, or combinations thereof. Similarly, the method 100 may include forming the first and second spar connecting members 36, 38 via additive manufacturing, thermoforming, vacuum forming, pultrusion, continuous molding, extrusion molding, or combinations thereof. For example, in one embodiment, the method 100 may include forming the various connecting members 36, 38, 46, 48 via thermoforming and additive manufacturing in the same process, which provides laminate surfaces using continuous fiber reinforcement in multiple directions (such as biaxial or triaxial) in a fast and efficient manner. More specifically, by thermoforming the shape of the web connecting members 46, 48 that interfaces with the spar caps 32, 34 and shear web(s) 40, the method 100 of the present disclosure can quickly create the ideal joining surface for thermoplastic welding that can optionally be reinforced as needed with a printed grid structure. Thus, alternatively, or in addition to, the method 100 may also include printing the grid structure in areas where an adhesive is used to join components.

In embodiments utilizing pultrusion, the pultruded parts are designed to flex enough to conform to the pre-bend shape of the rotor blade 16. Thus, in certain embodiments, the pultrusions may be segments that are optionally arranged together with an adhesive therebetween that will eventually melt together. In still further embodiments, the method 100 may include forming the first and second spar connecting members 36, 38 and/or the first and second web connecting members 46, 48 via continuous molding or extrusion molding.

Referring still to FIG. 5, as shown at 106, the method 100 includes securing the first and second web connecting member 46, 48 at the first and second ends 42, 44 of the shear web 40, respectively. For example, in several embodiments, the method 100 may include securing the first and second web connecting members 46, 48 to the first and second ends 42, 44 of the shear web 40, respectively, via infusion, insertion/ interference fit, adhesives, fasteners, or combinations thereof. The various adhesives described herein may include, for example, glue, tape, thermoset resin, methacrylates, epoxies, vinylesters, or any other suitable adhesives.

As mentioned, the first and second spar connecting members 36, 38 and/or the first and second web connecting members 46, 48 are formed of a thermoplastic material. As shown at 108, the method 100 includes interconnecting the first and second web connecting members 46, 48 with the first and second spar connecting members 36, 38, respectively, at the first and second joints 50, 52. In addition, as shown at 110, the method 100 includes heating the first and second joints 50, 52 to secure the first web connecting member 46 and the first spar connecting member 36, as well as the second web connecting member 48 and the second spar connecting member 38, together.

In another embodiment, the method 100 may include forming the lower shell member 22 of the rotor blade 16, placing the second spar cap 34 onto the lower shell member 22, and interconnecting the first web connecting member 46 and the first spar connecting member 36 at the first joint 50. In such embodiments, the method 100 also includes forming the upper shell member 20 of the rotor blade 16, placing the first spar cap 32 onto the upper shell member 20, and interconnecting the second web connecting member 48 and the second spar connecting member 38 at the second joint 52. Thus, as mentioned, the method 100 also includes heating the interconnected first and second joints 50, 52.

In additional embodiments, the method may include forming one or more portions of the first or second joints 50, 52 via an ultra-sound signal transmitting material. Thus, in such embodiments, the method 100 may include inspecting one or more portions of the first or second joints 50, 52 via non-destructive testing (NDT) inspection to check for defects in the joints 50, 52.

Referring now to FIG. 6, the method 100 may also include providing a cover material 60 atop the first and second spar connecting members 36, 38 and/or the first and second web connecting members 46, 48 to protect the various connecting members from debris (such as dirt or dust) before interconnecting. Thus, the cover material 60 can serve the function of maintaining the interfaces of the connecting members smooth to facilitate joining. In such embodiments, the method 100 may include removing the cover material 60 from the associated connecting members before interconnecting the male and female connecting members together. In addition, the cover material 60 can be used for surface roughness if required (e.g. using peel ply with a specific texture). In such embodiments, the method 100 may include maintaining the cover material 60 in place to assist in interconnecting the male and female connecting members together. Accordingly, the cover material 60 can act as a molding inlay used to ensure placement and spacing of the first and second spar connecting members 36, 38 prior to infusion.

In addition, as shown in FIG. 7, the method 100 may include placing a positioning spacer 62 atop the first and second spar connecting members 36, 38 for alignment of at least one of the first and second web connecting members 46, 48. In such embodiments, as shown, the spacer(s) 62 may be positioned atop the cover material 60.

Referring now to FIG. 8, a flow diagram of another embodiment of a method 200 for assembling a shear web assembly of a wind turbine 10 is illustrated. As shown at 202, the method 200 includes providing at least one spar cap (e.g. first spar cap 32). As shown at 204, the method 200 includes forming a spar connecting member (e.g. first spar connecting member 36) of a thermoplastic material via additive manufacturing. As shown at 206, the method 200 includes securing the spar connecting member 36 to the spar cap 32. As shown at 208, the method 200 includes providing a shear web, e.g. shear web 40. As shown at 210, the method 200 includes forming a web connecting member (e.g. first web connecting member 46) of a thermoplastic material via additive manufacturing. As shown at 212, the method 200 includes securing the web connecting member 46 at the first end of the shear web 40. As shown at 214, the method 200 includes interconnecting the web connecting member 46 and the spar connecting member 36 at a joint 50. As shown at 216, the method 200 includes securing the joint together via at least one of thermal welding, chemical welding, resistance welding, adhesives, solvent welding, or microwave heating. More specifically, resistance welding may use a metal mesh strip at the interface. In addition, for resistance welding, it is likely important to connect the mesh strip to a down conductor, which is also typically located on the shear web 40.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for assembling a rotor blade of a wind turbine, the method comprising:
    forming a first spar connecting member via an additive manufacturing process that utilizes computer numerical control and multiple degrees of freedom to deposit material to form the first spar connecting member;
    co-infusing the first spar connecting member with a first spar cap of the rotor blade;
    providing a shear web;
    forming a first web connecting member via an additive manufacturing process that utilizes computer numerical control and multiple degrees of freedom to deposit material to form the first web connecting member;
    co-infusing the first web connecting member at a first end of the shear web, the first spar connecting member and the first web connecting member formed of a thermoplastic material;
    interconnecting the first web connecting member and the first spar connecting member at a first joint; and,
    heating the first joint to secure the first web connecting member and the first spar connecting member together.

2. The method of claim 1, further comprising:
    forming a second spar connecting member via an additive manufacturing process that utilizes computer numerical control and multiple degrees of freedom to deposit material to form the second spar connecting member;
    co-infusing a second web connecting member at an opposing, second end of the shear web, the second spar connecting member and the second web connecting member formed of a thermoplastic material;
    interconnecting the second web connecting member and the second spar connecting member at a second joint; and,
    heating the second joint to secure the second web connecting member and the second spar connecting member together.

3. The method of claim 2, further comprising:
    forming a lower shell member of the rotor blade;
    forming a second spar cap on the lower shell member, the second spar cap comprising the second spar connecting member co-infused therewith;
    interconnecting the second web connecting member and the second spar connecting member at the second joint;
    forming an upper shell member of the rotor blade;
    forming the first spar cap on the upper shell member, the first spar cap comprising the first spar connecting member co-infused therewith;
    interconnecting the first web connecting member and the first spar connecting member at the first joint; and,
    heating the first and second joints.

4. The method of claim 2, further comprising:
    forming at least one of the first joint or the second joint via an ultra-sound signal transmitting material; and,
    inspecting at least one of the first joint or the second joint via non-destructive testing (NDT) inspection.

5. The method of claim 3, wherein forming the first and second spar caps comprising the first and second spar connecting members, respectively, further comprises:
    co-infusing the first spar connecting member with the first spar cap; and,
    co-infusing the second spar connecting member with the second spar cap.

6. The method of claim 1, wherein the first and second spar connecting members each comprise a female connector, the first and second web connecting members each comprising a corresponding male connector that fits within the female connectors of the first and second spar connecting members.

7. The method of claim 2, further comprising providing a cover material atop at least one of the first and second spar connecting members or the first and second web connecting members.

8. The method of claim 7, further comprising removing the cover material from at least one of the first and second spar connecting members or the first and second web connecting members before interconnecting the first web connecting member and the first spar connecting member and the second web connecting member and the second spar connecting member.

9. The method of claim 7, further comprising placing a positioning spacer atop at least one of the first and second spar connecting members for alignment of at least one of the first and second web connecting members.

10. The method of claim 1, further comprising reinforcing the thermoplastic material with at least one fiber material.

11. A method for assembling a shear web assembly of a rotor blade of a wind turbine, the method comprising:
    forming a spar connecting member of a thermoplastic material via an additive manufacturing process that utilizes computer numerical control and multiple degrees of freedom to deposit material to form the spar connecting member;
    co-infusing the spar connecting member to a spar cap of the rotor blade;
    providing a shear web;
    forming a web connecting member of a thermoplastic material via an additive manufacturing process that utilizes computer numerical control and multiple degrees of freedom to deposit material to form the web connecting member;
    co-infusing the web connecting member with a first end of the shear web;
    interconnecting the web connecting member and the spar connecting member at a joint; and,
    securing the joint together via thermoplastic welding.

12. A rotor blade assembly for a wind turbine, the rotor blade assembly comprising:
    a rotor blade comprising:
        an upper shell member having a first spar cap configured on an internal face thereof;
        a lower shell member having a second spar cap configured on an internal face thereof, the first and second spar caps comprising first and second spar connecting members, respectively; and,
        a shear web extending between the first and second spar caps along a longitudinal length of the rotor blade, the shear web comprising first and second web connecting members extending from opposing ends thereof, the first and second web connecting members received within the first and second spar connecting members to form first and second joints, respectively, the first and second spar connecting members and the first and second web connecting members each formed of a thermoplastic material via an additive manufacturing process that utilizes computer numerical control and multiple degrees of freedom to deposit material to form the first and second spar connecting members and the first and second web connecting members, wherein the first and second web connecting members are retained within the first and second spar connecting members via thermoplastic welding.

13. The rotor blade assembly of claim 12, wherein the first and second joints are absent of adhesive.

14. The rotor blade assembly of claim 12, wherein the first and second spar connecting members each comprise a female connector, the first and second web connecting members each comprising a corresponding male connector.

15. The rotor blade assembly of claim 14, wherein the male connectors further comprise opposing flanges that rest upon respective first and second spar caps.

16. The rotor blade assembly of claim 12, wherein the thermoplastic material is reinforced with at least one fiber material.

* * * * *